United States Patent
Song et al.

(10) Patent No.: US 6,917,394 B2
(45) Date of Patent: Jul. 12, 2005

(54) ARRAY SUBSTRATE AND METHOD THEREOF FOR LIQUID CRYSTAL DISPLAY DEVICE

(75) Inventors: Sang-Moo Song, Daegu (KR); Dong-Yeung Kwak, Daegu (KR); Se-Il Sohn, Milyang-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/228,329

(22) Filed: Aug. 27, 2002

(65) Prior Publication Data

US 2003/0053005 A1 Mar. 20, 2003

(30) Foreign Application Priority Data

Aug. 27, 2001 (KR) ........................................ 2001-51671

(51) Int. Cl.[7] ...................... G02F 1/1136; G02F 1/1343
(52) U.S. Cl. ............................. 349/43; 349/38; 349/142
(58) Field of Search ..................... 349/38–43, 139–144; 257/59, 72

(56) References Cited

U.S. PATENT DOCUMENTS 6,281,552 B1 * 8/2001 Kawasaki et al. .......... 257/350

FOREIGN PATENT DOCUMENTS

JP          04-307521      * 10/1992

* cited by examiner

*Primary Examiner*—Dung T. Nguyen
(74) *Attorney, Agent, or Firm*—McKenna, Long & Aldridge LLP

(57) ABSTRACT

An array substrate of the present invention includes a storage capacitor that has a storage-on-gate structure. One embodiment of the present invention discloses the array substrate having a metal island pattern on the substrate beneath a drain electrode. The metal island pattern is disposed beneath a drain contact hole through which a pixel electrode contacts the drain electrode. Since the metal island pattern has the same thickness as the gate line, the passivation layer can have the same height both in a drain region and in a storage region. Over-etching is minimized with the passivation layer in the drain and storage region having the same uniform thickness.

32 Claims, 20 Drawing Sheets

ARRAY SUBSTRATE AND METHOD THEREOF FOR LIQUID CRYSTAL DISPLAY DEVICE

This application claims the benefit of Korean Patent Application No. 2001-51671, filed on Aug. 27, 2001, in Korea, which is hereby incorporated by reference for all purposes as if fully set forth herein.

BACKGROUND OF THE INVENTION

1. Field of the Invention

The present invention relates to a liquid crystal display device, and more particularly to an array substrate for use in the liquid crystal display (LCD) device.

2. Discussion of the Related Art

Recently, light and thin liquid crystal display (LCD) devices with low power consumption are widely used in office automation equipment, video devices, and the like. Such LCDs typically use an optical anisotropy and spontaneous polarization of a liquid crystal (LC). The liquid crystal material has thin and long liquid crystal molecules, which cause a directional alignment of the liquid crystal molecules. Initially, an alignment direction of the liquid crystal molecules is controlled by applying an electric field to the liquid crystal molecules. With the alignment direction of the liquid crystal molecules properly adjusted, light is refracted along the alignment direction of the liquid crystal molecules to display image data. Of particular interest, because of its high resolution and superiority in displaying moving pictures, is an active matrix (AM) LCD in which a plurality of thin film transistors and pixel electrodes are arranged in matrix array.

FIG. 1 shows an exploded perspective view illustrating a conventional LCD device. The LCD device 1 includes an upper substrate 5 and a lower substrate 10 that are spaced apart and face each other, and a liquid crystal layer 11 interposed therebetween. The upper substrate 5 and the lower substrate 10 are called a color filter substrate and an array substrate, respectively. On the rear surface of the upper substrate 5, a black matrix 6 and a color filter layer 7, including a plurality of red (R), green (G) and blue (B) color filters, are formed. The black matrix 6 surrounds each color filter forming an array matrix. The upper substrate 5 also includes a common electrode 9 covering the color filter layer 7 and the black matrix 6. The common electrode 9 is preferably made of a transparent conductive material.

On the front surface of the lower substrate 10, thin film transistors (TFTs) acting as switching elements, are formed in the shape of an array matrix corresponding to the color filter layer 7. In addition, a plurality of gate and data lines 12 and 24 cross each other such that each TFT is positioned near each crossing of the gate and data lines 12 and 24. Each individual pair of gate and pair of data lines 12 and 24 defines a pixel region P. In the pixel region P, a pixel electrode 46 is disposed. The pixel electrode 46 is formed of a transparent conductive material, such as indium tin oxide, which has an excellent transmissivity.

The LCD device having the above-mentioned structure displays color images by applying signals through the TFTs to the pixel electrodes 46. The gate line 12 applies a first signal to a gate electrode of the TFT, and the data line 24 applies a second signal to a source electrode of the TFT. Therefore, the LCD device drives the liquid crystal molecules using their electro-optic characteristics.

The liquid crystal layer 11 is a dielectric anisotropic material having spontaneous polarization characteristics. Due to their dipole and spontaneous polarization when electric signals are applied to the electrode 46 and to the common electrode 9, the liquid crystal molecules of the liquid crystal layer 11 are rearranged in accordance with the electric field. As the liquid crystal molecules are rearranged, the optical property of the liquid crystal layer changes creating an electro-optic modulation effect.

FIG. 2 is an enlarged plan view illustrating a portion of an array substrate for the conventional LCD device of FIG. 1. The arrangement of the liquid crystal layer 11 is controlled by an array substrate 52 having the gate line 12 apply a scanning signal and the data line 24 apply an image signal. The thin film transistor (TFT) is connected to both the gate line 12 and the data line 24, and disposed near the crossing of the gate and data lines 12 and 24, with the pixel electrode 46 positioned in the pixel region P and connected to the TFT.

As mentioned above, the gate lines 12 are arranged in a transverse direction, and the data lines 24 are arranged perpendicular to the gate lines 12. A pair of gate lines 12 and a pair of data lines 24 define each pixel region P. Each of thin film transistors (TFTs) is arranged at a position where the gate line 12 and the data line 24 cross one another. The pixel electrode 46 is disposed on the pixel region P defined by the pair of gate lines 12 and the pair of data lines 24.

Each TFT includes a gate electrode 14 to receive the scanning signal from the gate line 12, a source electrode 26 to receive the image signal from the data line 24, and a drain electrode 28 to connect the image signal to the pixel electrode 46. Further, each TFT includes an active layer 20 between the source electrode 26 and the drain electrode 28, with the drain electrode 28 facing the source electrode across the active layer 20. The active layer 20 is made of, for example, amorphous silicon (a—Si:H) or polycrystalline silicon. The gate electrode 14 extends from the gate line 12 and the source electrode 26 extends from the data line 24. The drain electrode 28 is connected to the pixel electrode 46 through a contact hole.

The pixel electrode 46 extends over the gate line 12 defining a storage capacitor C with a portion of the pixel electrode 46. Furthermore, gate pads 16 are formed at the end of the gate lines 12, respectively. A gate pad electrode 48 is disposed on each gate pad 16 to receive the scanning signal from a drive IC (not shown) and then applys the scanning signal to the gate lines 12 throughout the gate pad 16. Data pads 30 are disposed at the end of the data lines 24, respectively. A data pad electrode 50 is located on each data pad 30, to receive the image signal from a drive IC (not shown) and then to apply the image signal to the data line 24 through the data pad 30.

When the scanning signal is applied to the gate electrode 14 connected to the gate line 12, the TFT is activated (i.e., ON-STATE). The image signal is applied to the pixel electrode 46 through the TFT and the resulting electric field rearranges the liquid crystal by polarizing action.

Alternatively, when the scanning signal is not applied to the gate electrode 14, the TFT is not activated (i.e., OFF-STATE) and the image signal is not applied to the pixel electrode 46. In the OFF-STATE, the electric charges stored in the pixel region P are discharged to the TFT and to the liquid crystal. To prevent this discharge phenomenon, a storage capacitor C is connected in parallel to the pixel electrode 46. The storage capacitor C supplements the discharged electric charges with the stored electric charges. The storage capacitor C includes a capacitor electrode 32 that acts as a first electrode of the storage capacitor. A portion of the gate line 12 acts as a second electrode of the storage capacitor. The capacitor electrode 32 has an island shape and is positioned over the gate line 12, and the pixel electrode 46 contacts the island-shaped capacitor electrode 32 through a contact hole 38. With the capacitor electrode 32 interposed between the gate line 12 and the pixel electrode 46, the thickness of a dielectric layer of the storage capacitor C is minimized. Due to the thin dielectric layer, the capacitance of the storage capacitor can be raised.

With reference to FIGS. 3A to 3E, 4A to 4E, and 5A to 5E, a fabrication process for the conventional array substrate is explained. FIGS. 3A to 3E are sequential cross-sectional views taken along line III—III of FIG. 2, and illustrate manufacturing the thin film transistor and the pixel region. FIGS. 4A to 4E are sequential cross-sectional views taken along line IV—IV of FIG. 2, and illustrate forming the gate pad. FIGS. 5A to 5E are sequential cross-sectional views taken along line V—V of FIG. 2, and illustrate forming the data pad.

The fabrication process begins, as shown in FIGS. 3A, 4A and 5A, with a first metal deposited and patterned upon a transparent substrate 10 to form the gate line 12, the gate electrode 14, and the gate pad 16. Conventionally, the first metal employed is aluminum (Al), tungsten (W), molybdenum (Mo) or chromium (Cr). The gate line 12 extends from and connects with the gate pad 16, with the gate electrode 14 protruding from the gate line 12 (in FIG. 2). As discussed above, the gate pad 16 supplies the scanning signal to the gate line 12.

As shown in FIGS. 3B, 4B and 5B, a gate insulation layer 18 is formed on the transparent substrate 10 covering the metal layer previously formed. The gate insulation layer 18 may be an inorganic substance, such as silicon nitride ($SiN_x$) or silicon oxide ($SiO_2$), or an organic substance, such as benzocyclobutene (BCB) or acryl-based resin. Next, amorphous silicon (a—Si:H) and impurity-doped amorphous silicon ($n^+/p^+$ a—Si:H) are formed in series on the gate insulation layer 18. The amorphous silicon and impurity-doped amorphous silicon are simultaneously patterned to form an active layer 20 and an ohmic contact layer 22, respectively. The active layer 20 is formed on the gate insulation layer 18, particularly over the gate electrode 14, and the ohmic contact layer 22 is formed over the active layer 20.

Next, as shown in FIGS. 3C, 4C and 5C, the source electrode 26 and the drain electrode 28 are formed from a second metal over the ohmic contact layer 22. By depositing and patterning the second metal, both the source electrode 26 and the drain electrode 28 are formed. Along with the data line 24 (in FIG. 2), the capacitor electrode 32 and the data pad 30 are formed on the gate insulation layer 18 such that the source electrode 26 extends from the data line 24. The source electrode 26 and the drain electrode 28 are spaced apart from each other and respectively overlap opposite ends of the gate electrode 14. The data pad 30 is positioned at the end of the data line 24 and supplies the image signal to the data line 24, as discussed above. The capacitor electrode 32 has an island shape and overlaps a portion of the gate line 12 to define the storage capacitor C of FIG. 2. Moreover, a portion of the ohmic contact layer 22 between the source electrode 26 and drain electrode 28 is eliminated to form a channel region CH.

Next, as shown in FIGS. 3D, 4D and 5D, a passivation layer 34 is formed on and over the above-mentioned intermediates with an organic substance such as benzocyclobutene (BCB) or an acryl-based resin. By patterning the passivation layer 34, a drain contact hole 36 is formed that exposes a portion of the drain electrode 28. Next, a capacitor contact hole 38 and a data pad contact hole 42 are also formed. The capacitor contact hole 38 exposes a portion of the capacitor electrode 32, and the data pad contact hole 42 exposes a portion of the data pad 30. Furthermore, by patterning both the passivation layer 34 and the gate insulation layer 18, a gate pad contact hole 40 is formed that exposes a portion of the gate pad 16.

Next, as shown in FIGS. 3E, 4E and 5E, a transparent conductive material, such as indium zinc oxide (IZO) or indium tin oxide (ITO), is deposited upon the passivation layer 34 having the contact holes and subsequently patterned to form the pixel electrode 46, the gate pad electrode 48 and the data pad electrode 50. As shown in FIG. 3E, the pixel electrode 46 electrically contacts the drain electrode 28 and the capacitor electrode 32 through the drain contact hole 36 and through the capacitor contact hole 38, respectively. As shown in FIG. 4E, the gate pad electrode 48 electrically contacts the gate pad 16 through the gate pad contact hole 40. As shown in FIG. 5E, the data pad electrode 50 electrically contacts the data pad 30 through the data pad contact hole 42.

In the array substrate fabricated by the process described above, the storage capacitor C includes the overlapping portion of the gate line 12 as a first electrode, the capacitor electrode 32 as a second electrode, and the gate insulation layer as a dielectric layer. The pixel electrode 46 is electrically connected with the capacitor electrode 32. Furthermore, since the gate insulation layer 18 is interposed between the gate line 12 and the capacitor electrode 32 in the above-mentioned storage capacitor C, the gate insulation layer 18 acts only as a dielectric layer, that increases the capacitance of the storage capacitor C. The capacitor C does not use both the gate insulation layer and the passivation layer as a dielectric. layer.

However, the processes described above have some drawbacks, especially during the process of forming the contact holes through the passivation layer 34. In FIG. 3E, the array substrate may be divided into the pixel region P where the pixel electrode 46 is disposed, a drain region D exists where the pixel electrode 46 contacts the drain electrode 28, and a storage region S exists where the storage capacitor C is disposed. In view of the drain region D, the layer structure consists of the gate insulation layer 18, the drain electrode 28 and the passivation layer 34. Alternatively, in the storage region S, the layer structure consists of the gate line 12, the gate insulation layer 18, the capacitor electrode 32 and the passivation layer 34. As compared with the drain region D, the storage region S includes one metal layer, i.e., the gate line 12. Additionally, the passivation layer 34 actually planarizes the surface of the array substrate. Therefore, the passivation layer 34 has different thickness in the drain region D and in the storage region S, respectively. A portion of the passivation layer 34 in the drain region D, directly over the drain electrode 28, is thicker than the respective storage region S, directly over the capacitor electrode 32. More specifically, the passivation layer 34 in the storage region S is as thin as a step of the gate line 12.

Accordingly, an over-etching occurs in the capacitor contact hole 38 when simultaneously forming the drain contact hole 36 and the capacitor contact hole 38 in the drain region D and in the storage region S using a dry etch method since the passivation layer 34 has different thicknesses at the drain region D and the storage region S.

Moreover, the over-etch of the capacitor contact hole 38 often exposes the lower gate line 12. Thus, although the pixel electrode 46 should be connected with only the capacitor electrode 32 when the pixel electrode 46 is formed on the passivation layer 34, the pixel electrode 46 comes in contact with the data line 12. When the pixel electrode 46 is connected to the gate line 12, the storage capacitor C does not operate properly. Specifically, since the capacitor electrode 32 (a first electrode of the storage capacitor) is short-circuited with the gate line 12 (a second electrode of the storage capacitor) by the pixel electrode 46, which results in the liquid crystal layer not being appropriately arranged, and causing the liquid crystal panel to malfunction.

SUMMARY OF THE INVENTION

Accordingly, the present invention is directed to a liquid crystal display (LCD) device that substantially obviates one or more of the problems due to limitations and disadvantages of the related art.

An advantage of the present invention is to provide an array substrate for use in an LCD device which prevents a short circuit between a pixel electrode and a gate line beneath, thereby increasing manufacturing yield.

Additional features and advantages of the invention will be set forth in the description that follows and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for use in a liquid crystal display device includes a substrate; at least a gate line, a gate electrode and a metal island pattern which are formed on the substrate, the gate line arranged in a transverse direction, the gate electrode extending from the gate line, the metal island pattern disposed next to the gate electrode and isolated from the gate electrode and the gate line; a gate insulation layer formed on the substrate while covering the gate line, the gate electrode and the metal island pattern; an active line and an active layer on the gate insulation layer, and an ohmic contact layer on the active line and on the active layer, wherein the active line is arranged in a longitudinal direction perpendicular to the gate line and the active layer extends from the active line over the gate electrode and over the metal island pattern; at least a data line, a source electrode, a drain electrode and a capacitor electrode, wherein the data line is arranged in a longitudinal direction to overlap the active line and defines a pixel region with the gate line, wherein the a source electrode is on the ohmic contact layer and extends from the data line, wherein the drain electrode is disposed on the ohmic contact layer over the metal island pattern and spaced apart from the source electrode, and wherein the capacitor electrode is positioned over the gate line and has an island shape; a passivation layer on the gate insulation layer to cover the data line, the source electrode, the drain electrode and the capacitor electrode, wherein the passivation layer has a drain contact hole to the drain electrode over the metal island pattern and a storage contact hole to the capacitor electrode, and wherein the storage contact hole is disposed over the gate line; and a pixel electrode formed on the passivation layer in the pixel region, the pixel electrode contacting the drain electrode and the drain electrode through the drain contact hole and through the storage contact hole, respectively.

In another aspect of the present invention, the array substrate further includes a silicon island pattern interposed between the gate insulation layer and the capacitor electrode. The silicon island pattern is comprised of amorphous silicon and impurity-doped amorphous silicon, and has the same shape as the capacitor electrode. Additionally, the array substrate further includes a gate pad and a data pad, wherein the gate pad is formed at the end of the gate line and the data pad is formed at the end of the data line. The array substrate further includes a gate pad terminal that contacts the gate pad and a data pad terminal that contacts the data pad. The ohmic contact layer is interposed between the active line and the data line. The ohmic contact layer is also interposed between the active layer and the source electrode and between the active layer and the drain electrode. The metal island pattern has the same height as the gate line.

Another aspect of the present invention provides a method of forming an array substrate for use in a liquid crystal display device, which includes providing a substrate; simultaneously forming at least a gate line, a gate electrode and a metal island pattern on the substrate, wherein the gate line is arranged in a transverse direction, wherein the gate electrode extends from the gate line, and wherein the metal island pattern is disposed next to the gate electrode and isolated from the gate electrode and the gate line; forming a gate insulation layer on the substrate to cover the gate line, the gate electrode and the metal island pattern; simultaneously forming an active line and an active layer on the gate insulation layer, and forming an ohmic contact layer on the active line and on the active layer, wherein the active line is arranged in a longitudinal direction perpendicular to the gate line and the active layer extends from the active line over the gate electrode and over the metal island pattern; simultaneously forming at least a data line, a source electrode, a drain electrode and a capacitor electrode, wherein the data line is arranged in a longitudinal direction to overlap the active line and defines a pixel region with the gate line, wherein the a source electrode is on the ohmic contact layer and extends from the data line, wherein the drain electrode is disposed on the ohmic contact layer over the metal island pattern and spaced apart from the source electrode, and wherein the capacitor electrode is positioned over the gate line and has an island shape; forming a passivation layer on the gate insulation layer to cover the data line, the source electrode, the drain electrode and the capacitor electrode; patterning the passivation layer so as to form a drain contact hole to the drain electrode over the metal island pattern and to form a storage contact hole to the capacitor electrode, and wherein the storage contact hole is disposed over the gate line; and forming a pixel electrode on the passivation layer in the pixel region, the pixel electrode contacting the drain electrode and the drain electrode through the drain contact hole and through the storage contact hole, respectively. The method further includes forming a silicon island pattern between the gate insulation layer and the capacitor electrode.

The silicon island pattern is comprised of amorphous silicon and impurity-doped amorphous silicon, and has the same shape as the capacitor electrode. The method further includes forming a gate pad at the end of the gate line and a data pad at the end of the data line, and simultaneously forming a gate terminal pad and a data pad terminal, wherein the gate pad terminal contacts the gate pad and a data pad terminal contacts the data pad. The ohmic contact layer is interposed between the active line and the data line. The ohmic contact layer is also interposed between the active layer and the source electrode and between the active layer and the drain electrode. The metal island pattern has the same height as the gate line.

Yet another aspect of the present invention provides an array substrate for use in a liquid crystal display device, which includes a substrate; gate and data lines which cross each other to define a pixel region; a thin film transistor positioned near a crossing of the gate and data lines, wherein the thin film transistor includes a gate electrode, an active layer, an ohmic contact layer, a source electrode and a drain electrode; a metal island pattern formed on the substrate beneath the drain electrode next to the gate electrode; a storage capacitor including a portion of the gate line as a first electrode and a capacitor electrode as a second electrode; and a pixel electrode positioned in the pixel region, the pixel electrode contacting the capacitor electrode through a storage contact hole. The active layer is formed of amorphous silicon and the ohmic contact layer is formed of impurity-doped amorphous silicon. The ohmic contact layer is interposed between the active layer and the source electrode and between the active layer and the drain electrode. Also, the ohmic contact layer extends beneath the data line such that the data line overlaps the ohmic contact layer. The array substrate further includes a silicon island pattern interposed between the gate line and the capacitor electrode. The silicon island pattern contacts the capacitor electrode and has the same shape as the capacitor electrode, and is comprised of amorphous silicon and impurity-doped amorphous silicon.

Still another aspect of the present invention provides a method of forming an array substrate for use in a liquid crystal display device, which includes providing a substrate; forming a gate line on the substrate; forming a data line which cross the gate line to define a pixel region; forming a thin film transistor positioned near a crossing of the gate and data lines, wherein the thin film transistor includes a gate electrode, an active layer, an ohmic contact layer, a source electrode and a drain electrode; forming a metal island pattern on the substrate, wherein the metal island pattern is disposed beneath the drain electrode and next to the gate electrode; forming a storage capacitor that a portion of the gate line as a first electrode and a capacitor electrode as a second electrode; and forming a pixel electrode in the pixel region, the pixel electrode contacting the capacitor electrode through a storage contact hole. The active layer is made of amorphous silicon and the ohmic contact layer is made of impurity-doped amorphous silicon. The ohmic contact layer is formed between the active layer and the source electrode and between the active layer and the drain electrode. Additionally, the ohmic contact layer extends beneath the data line such that the data line overlaps the ohmic contact layer. The method further includes forming a silicon island pattern between the gate line and the capacitor electrode. The silicon island pattern contacts the capacitor electrode and has the same shape as the capacitor electrode, is made of amorphous silicon and impurity-doped amorphous silicon.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an illustrated embodiment of the present invention, which is shown in the accompanying drawings. Wherever possible, the same reference numbers will be used throughout the drawings to refer to the same or like parts.

Figure 1:
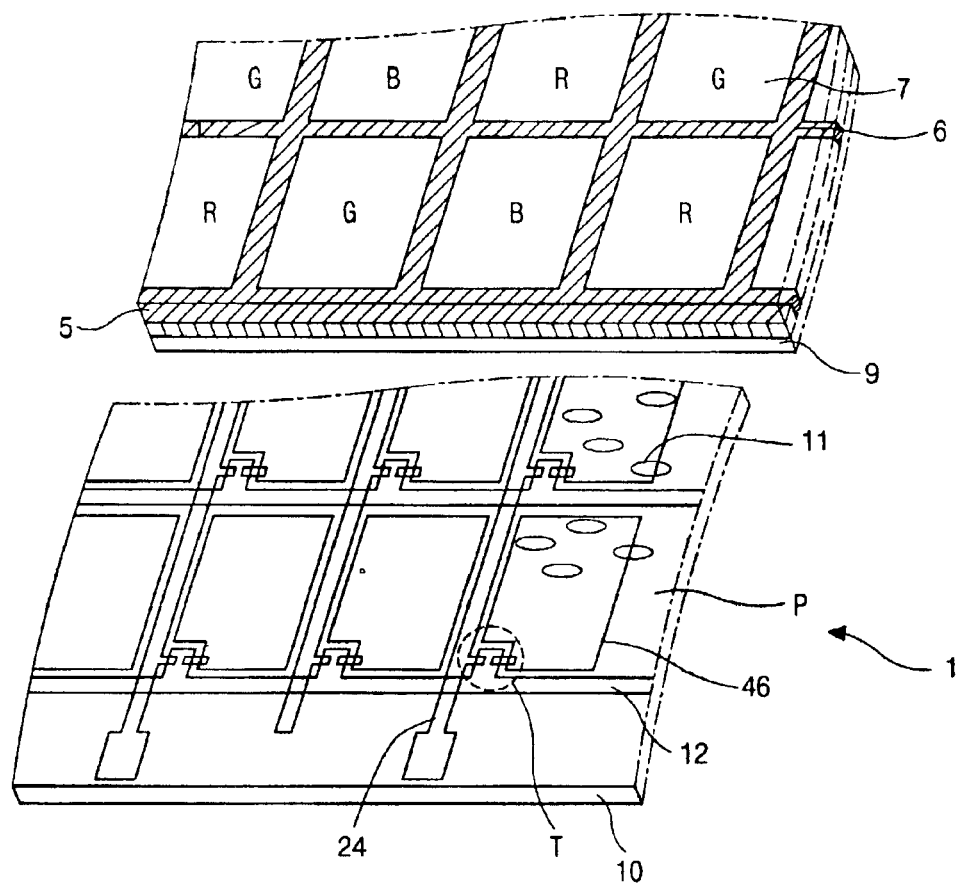
FIG. 1 is an exploded perspective view illustrating a conventional LCD device.
Figure 2:
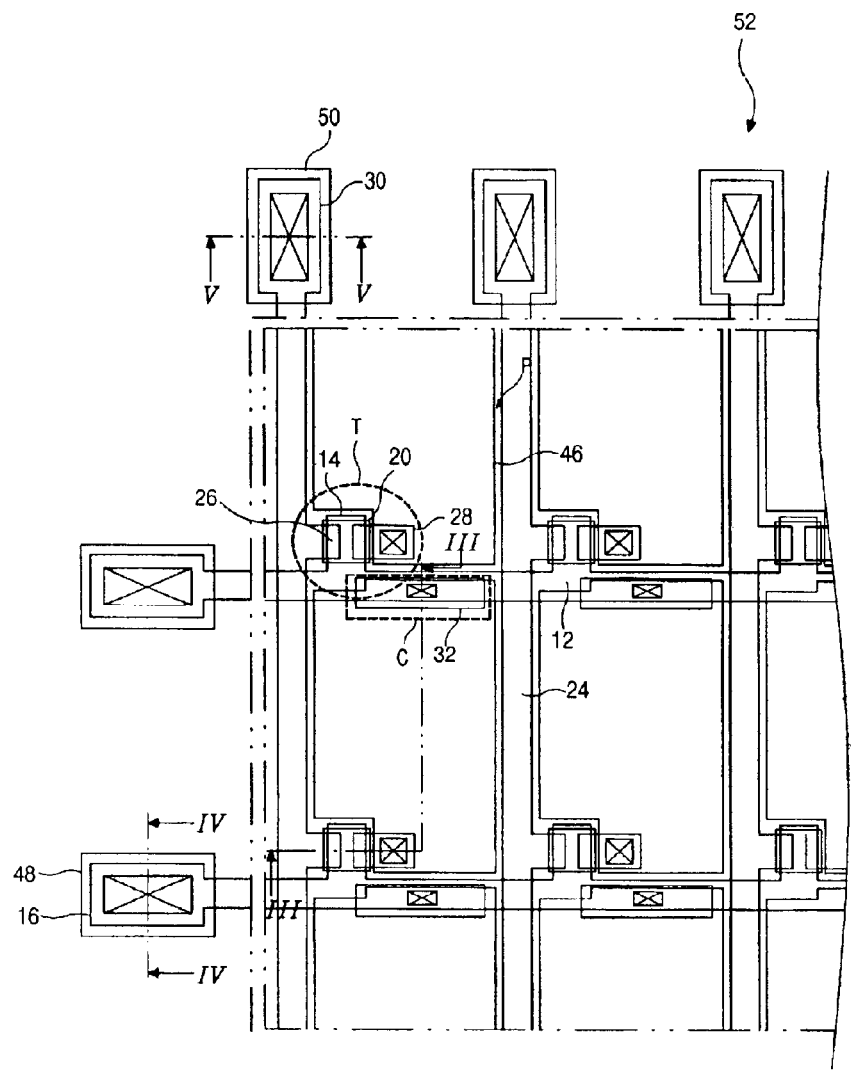
FIG. 2 is an enlarged plan view illustrating a portion of an array substrate for the conventional LCD device of FIG. 1.
Figure 3A:
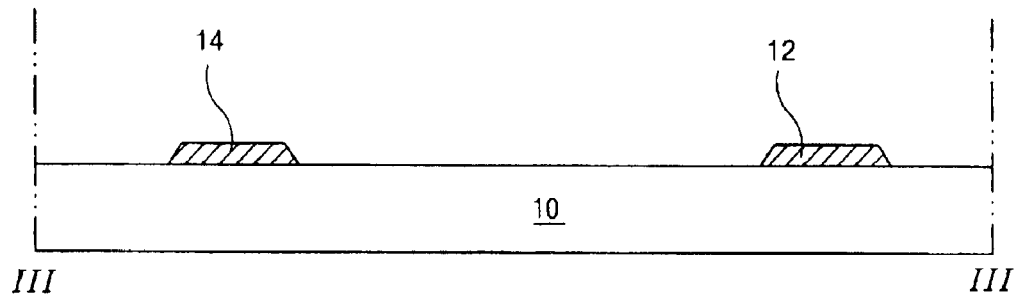
FIGS. 3A to 3E are sequential cross-sectional views taken along line III—III of FIG. 2 and illustrate manufacturing the thin film transistor and the pixel region.
Figure 3B:
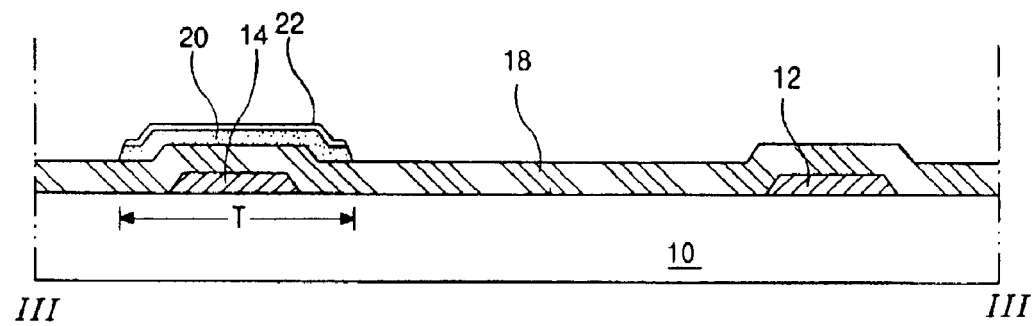
Figure 3C:
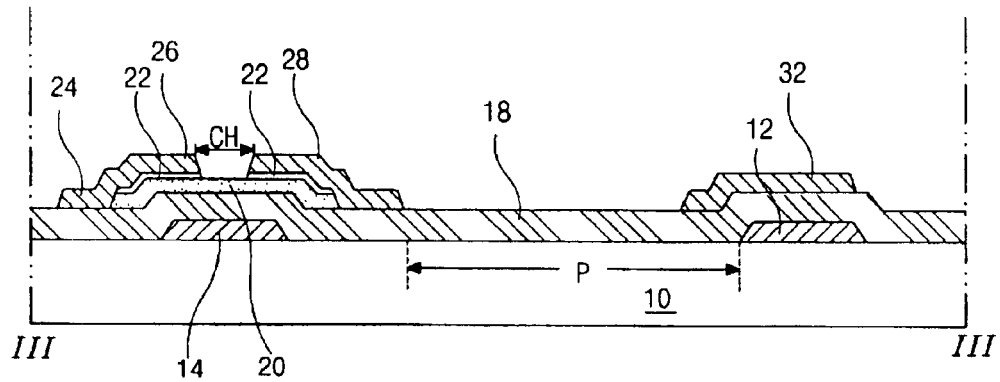
Figure 3D:
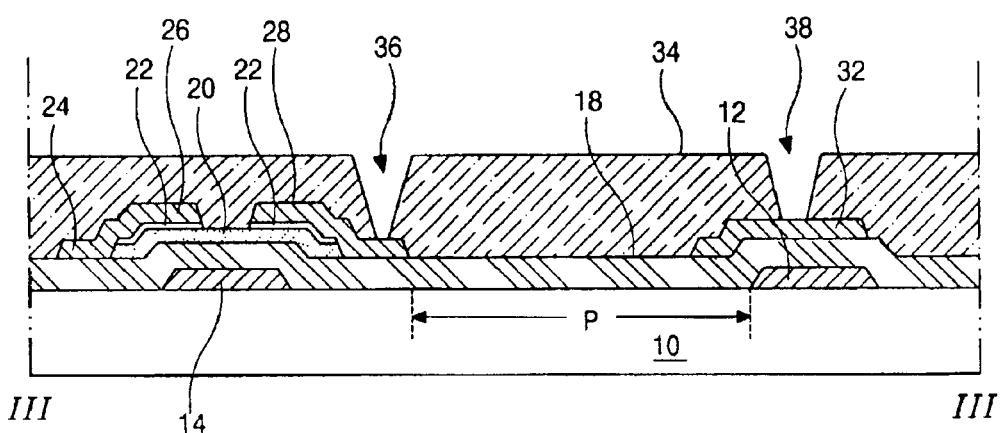
Figure 3E:
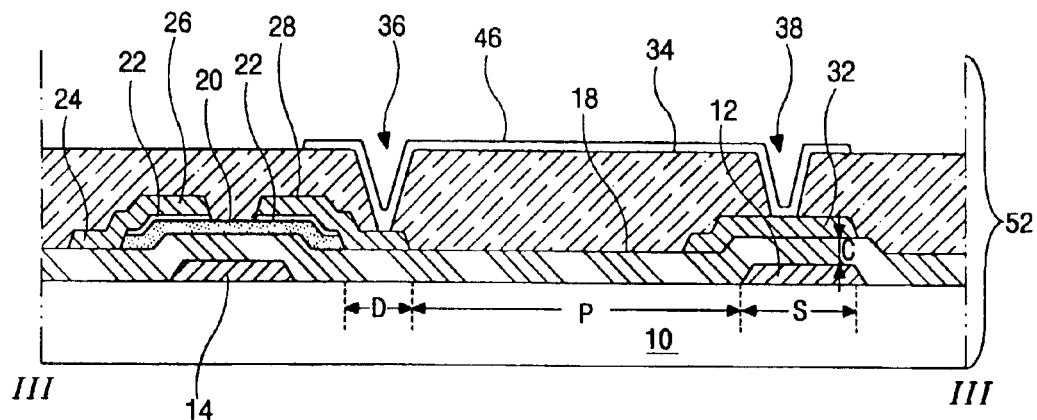
Figure 4A:
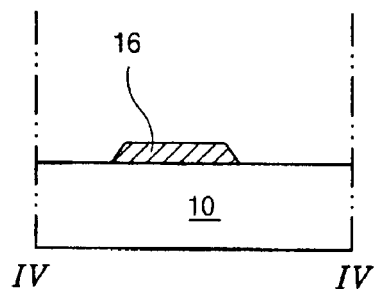
FIGS. 4A to 4E are sequential cross-sectional views taken along line IV—IV of FIG. 2 and illustrate forming the gate pad.
Figure 4B:
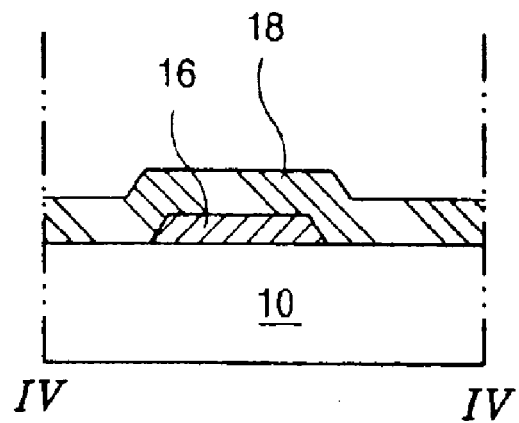
Figure 4C:
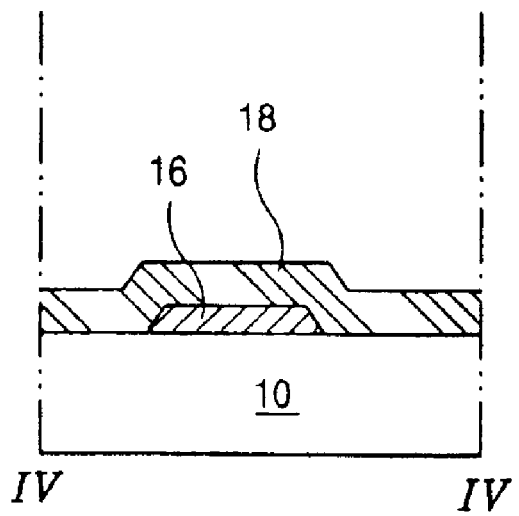
Figure 4D:
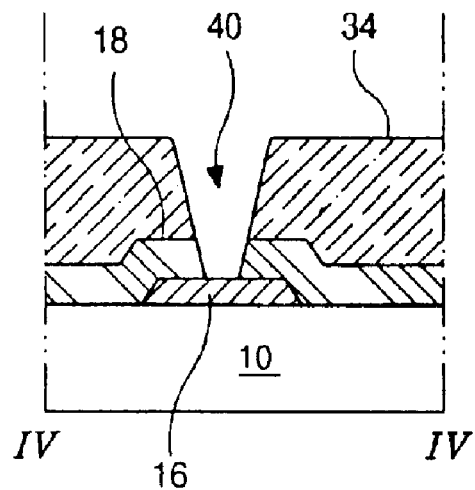
Figure 4E:
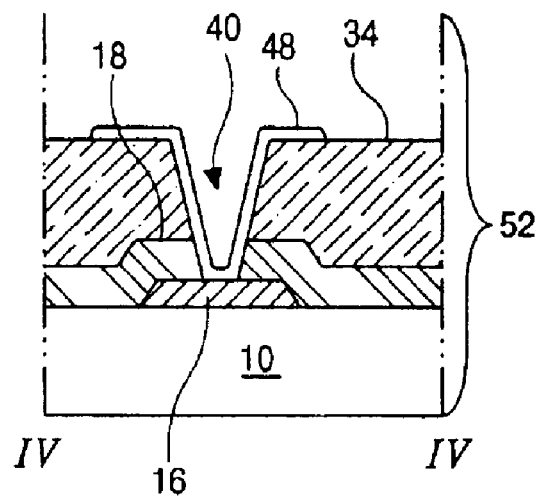
Figure 5A:
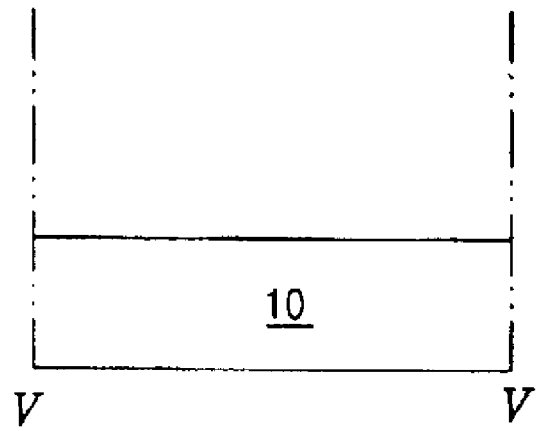
FIGS. 5A to 5E are sequential cross-sectional views taken along line V—V of FIG. 2 and illustrate forming the data pad.
Figure 5B:
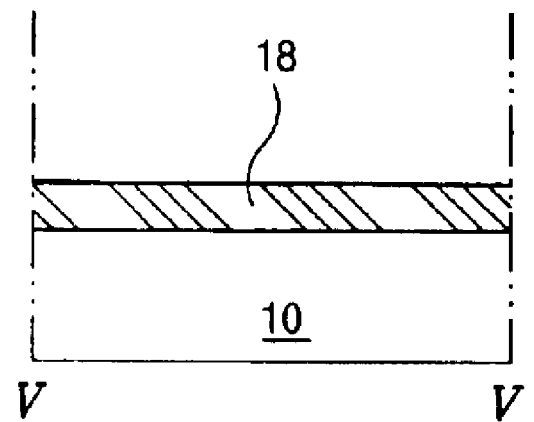
Figure 5C:
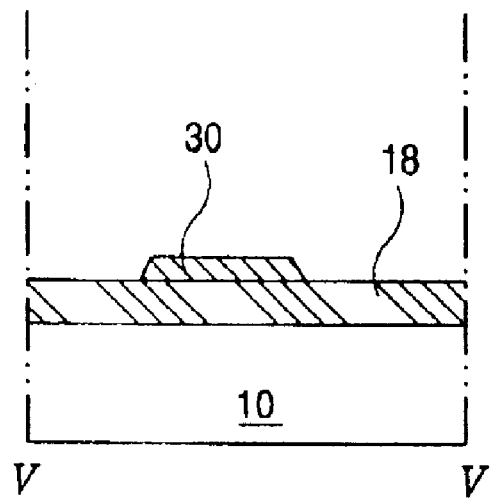
Figure 5D:
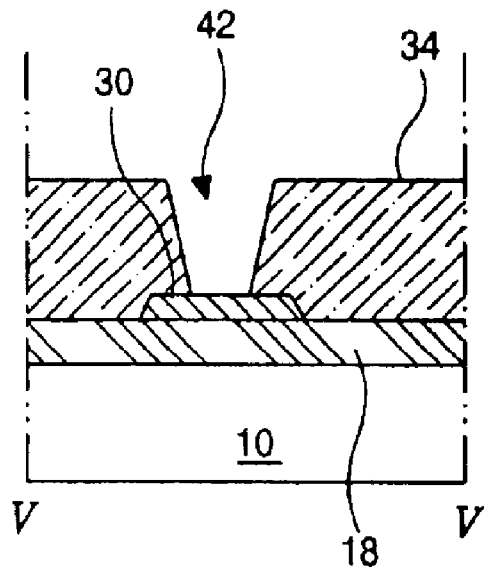
Figure 5E:
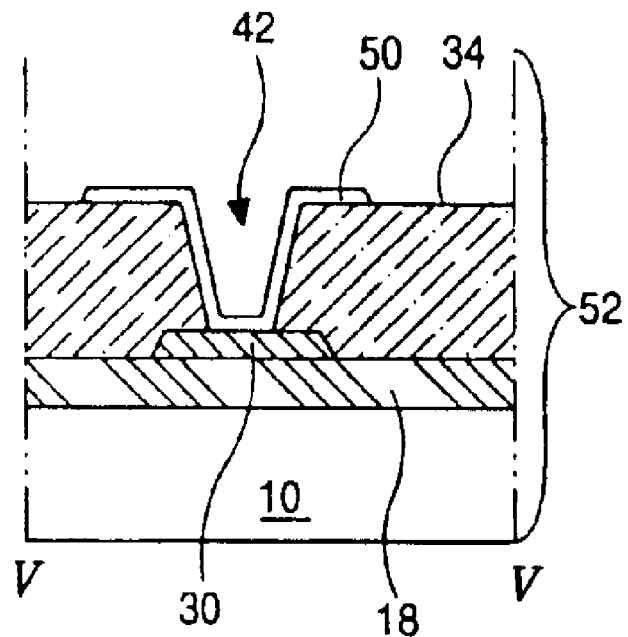
Figure 6:
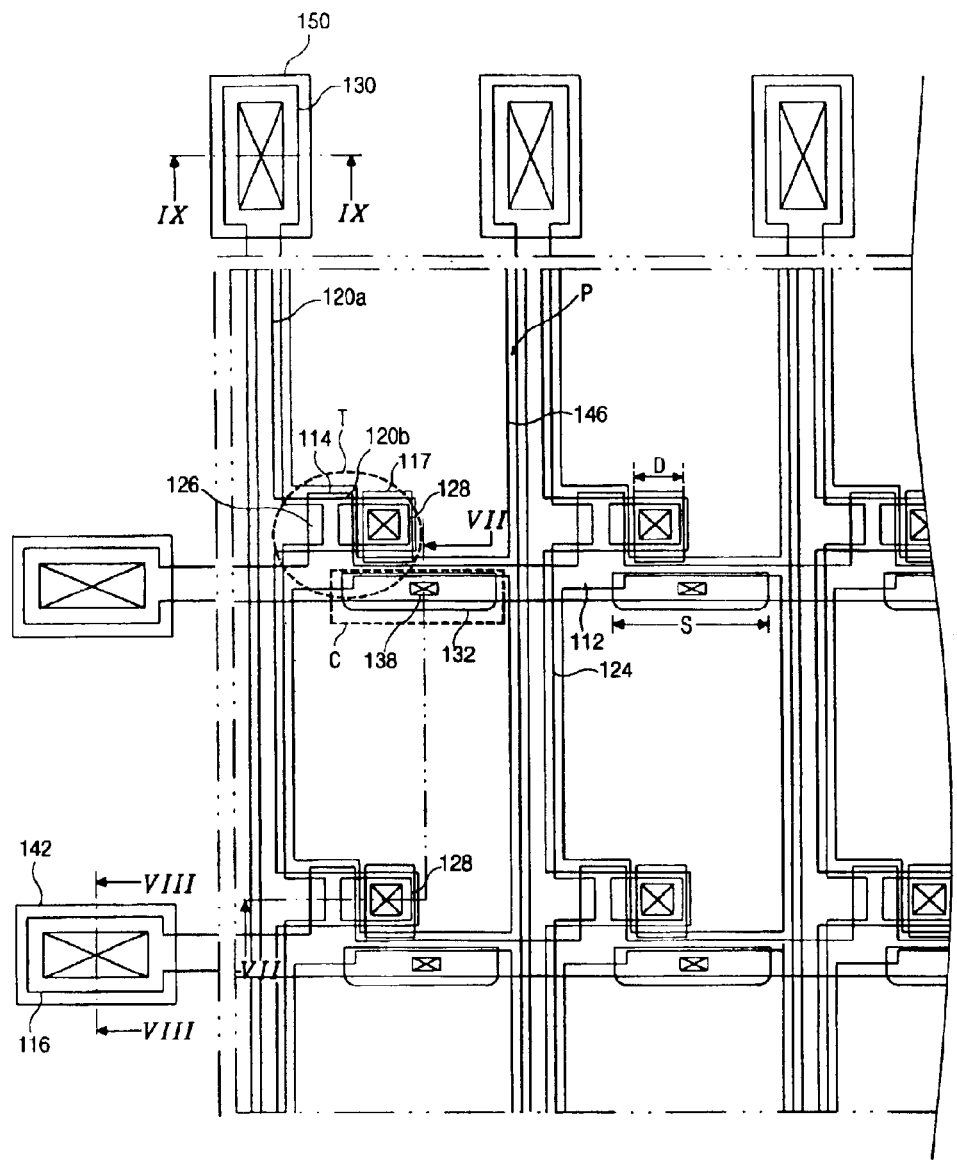
FIG. 6 is an enlarged plan view illustrating a portion of an array substrate for an LCD device according to the present invention.

Referring to FIG. 6, an enlarged plan view illustrating a portion of an array substrate for an LCD device according to the present invention, gate lines 112 are arranged in a transverse direction, and data lines 124 are arranged in a longitudinal direction perpendicular to the gate lines 112. A pair of gate and data lines 112 and 124 define a pixel region P. Each of thin film transistors (TFTs) is arranged in the pixel region P at a position where the gate line 112 and the data line 124 cross each other. A gate pad 116 is disposed at the end of each gate line 112, and a gate pad terminal 142 is disposed over the gate pad 116. The gate pad terminal 142 electrically contacts the gate pad 116 through a contact hole. A data pad 130 is disposed at the end of each data line 124, and a data pad terminal 150 is positioned over the data pad 130 contacting the data pad 130 through a contact hole.

The thin film transistor TFT includes a gate electrode 114 that extends from the gate line 112, a source electrode 126 that extends from the data line 124, and a drain electrode 128 that are spaced apart from the source electrode 126. The gate pad 116 supplies a scanning signal to the gate electrode 114 throughout the gate line 112, and the data pad 130 supplies an image signal to the source electrode 126 throughout the data line 124.

Moreover, in the present invention, the thin film transistor TFT includes an active layer 120*b* and a metal island pattern 117 in a drain region D. The metal island pattern 117 is formed with the gate line 112 and the gate electrode 114, but is isolated from the gate line 112 and electrode 114. The metal island pattern 117 also has the same thickness as the gate line 112 and is disposed beneath the drain electrode 128. The active layer 120*b* is disposed between the source 126 and drain 128 electrodes. Additionally, the active layer 120b extends from an active line 120a over the drain region D and electrically contacts the source and drain electrodes 126 and 128. The active layer 120b is formed just under the data line 124. The active line 120a beneath the data line 124 increases the adherence of the metallic data line 124 over the active line 120a.

Still referring to FIG. 6, a pixel electrode 146 is disposed in the pixel region P and contacts the drain electrode 128 of the TFT through a contact hole of the drain region D. A portion of the pixel electrode 146 extends over the gate line 112 forming a storage capacitor C. The pixel electrode 146 protrudes over a storage region S where a capacitor electrode 132 is formed. The capacitor electrode 132 has an island shape and is disposed over the gate line 112. The island-shaped capacitor electrode 132 is also interposed between the gate line 112 and the pixel electrode 146. The capacitor electrode 132 is connected with the pixel electrode 146 through a storage contact hole 138. As shown in FIG. 6, with the storage capacitor C a portion of the gate line 112 acts as a first electrode of the storage capacitor C, and the capacitor electrode 132 connected to the pixel electrode 146 acts as a second electrode of the storage capacitor C. Although not shown in FIG. 6, a gate insulation layer serves as a dielectric layer of the storage capacitor C.

Still referring to FIG. 6, the metal island pattern 117 is formed in the drain region D where a drain contact hole is formed and then the pixel electrode 146 contacts the drain electrode 128 through that drain contact hole. The metal island pattern 117 is formed with the gate line 112 and has the same thickness as the gate line 112. Forming the metal island pattern under the drain electrode 128 creates a passivation layer (not shown) that may have the same thickness in the drain region D as in the storage region S. With an equivalent thickness of the passivation layer in both the drain region D and the storage region S no over-etch is formed in the storage contact hole 138 using the dry etch method.

Next, shown in FIGS. 7A to 7F, 8A to 8F and 9A to 9F is a fabrication process for the inventive array substrate according to the present embodiment. FIGS. 7A to 7F show sequential cross-sectional views taken along line VII—VII of FIG. 6 and illustrate a process for manufacturing the thin film transistor, the storage capacitor and the pixel region. FIGS. 8A to 8F show sequential cross-sectional views taken along line VIII—VIII of FIG. 6 and illustrate a process for forming the gate pad. FIGS. 9A to 9F show sequential cross-sectional views taken along line IX—IX of FIG. 6 and illustrate a process for forming the data pad.

Figure 7A:
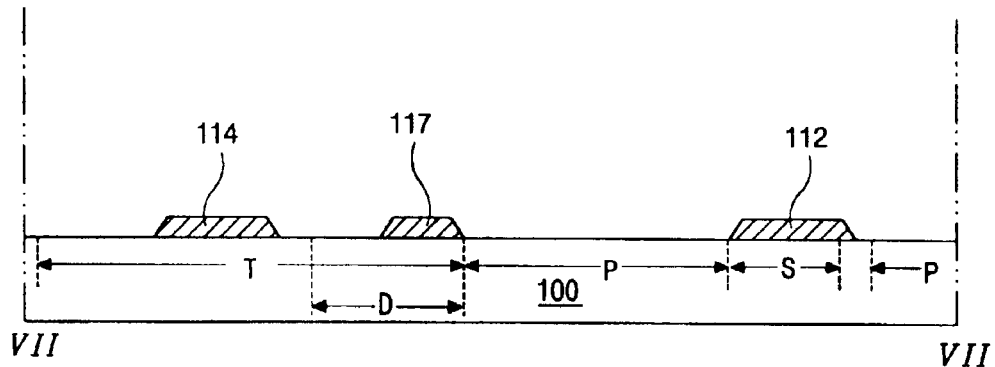
FIGS. 7A to 7F are sequential cross-sectional views taken along line VII—VII of FIG. 6 and illustrate manufacturing a thin film transistor, a storage capacitor and a pixel region.
Figure 8A:
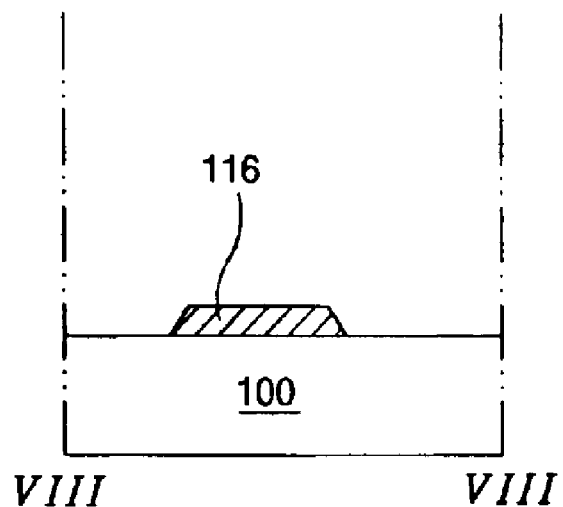
FIGS. 8A to 8F are sequential cross-sectional views taken along line VIII—VIII of FIG. 6 and illustrate forming a gate pad.
Figure 9A:
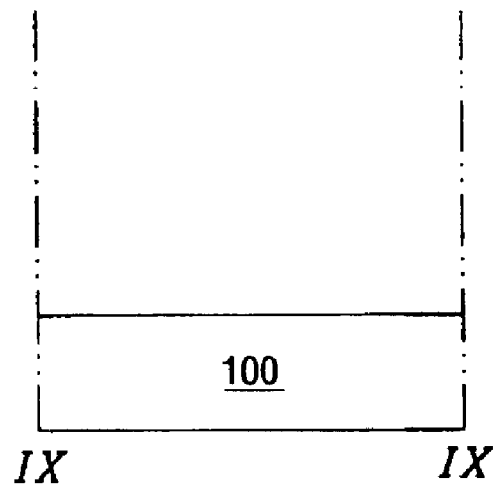
FIGS. 9A to 9F are sequential cross-sectional views taken along line IX—IX of FIG. 6 and illustrate forming a data pad.

The fabrication process begins as shown in FIGS. 7A, 8A and 9A, with a first metal deposited and patterned upon a transparent substrate 100 to form the gate line 112, the gate electrode 114, the gate pad 116, and the metal island pattern 117. The present embodiment employs a first metal, aluminum (Al), tungsten (W), molybdenum (Mo) or chromium (Cr). The gate line 112 extends from and connects with the gate pad 116, with the gate electrode 114 protruding from the gate line 112 (in FIG. 6). As discussed above, the gate pad 116 supplies the scanning signal to the gate line 112. The metal island pattern 117 is isolated from the gate line 112 and electrode 114, and disposed in the drain region D next to the gate electrode 114.

Figure 7B:
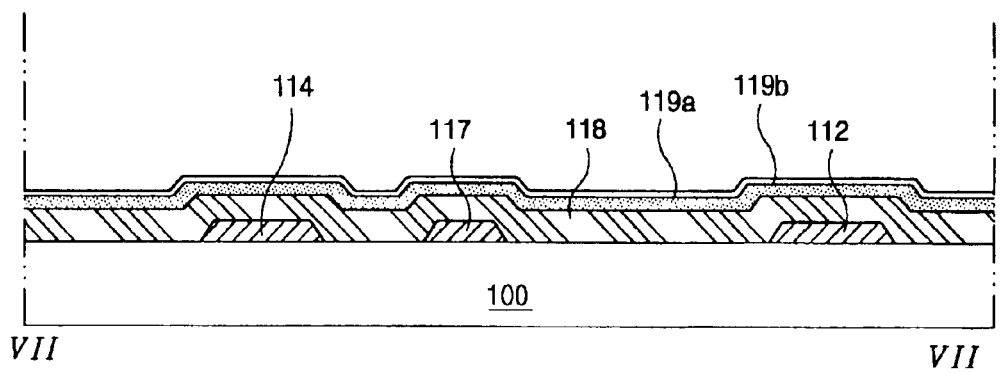
Figure 8B:
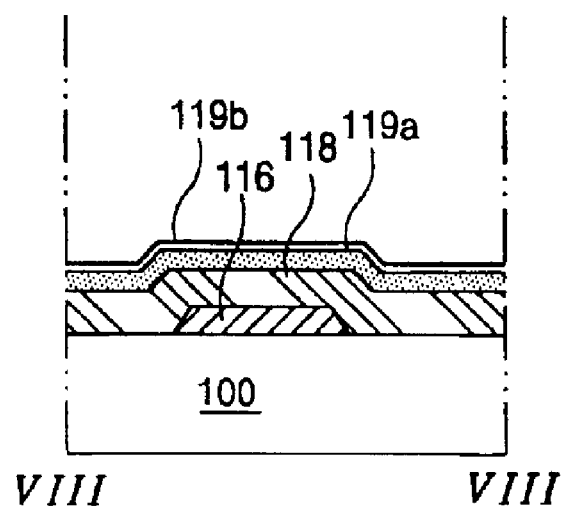
Figure 9B:
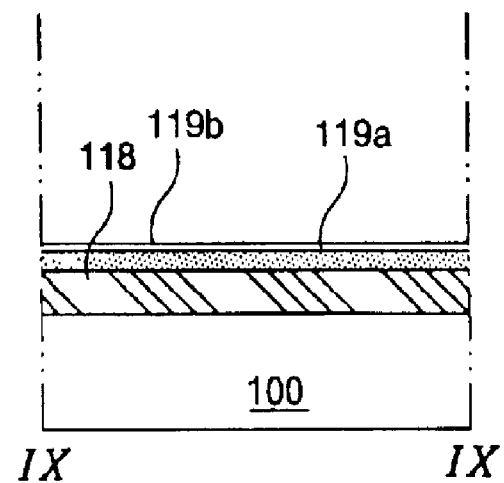

As shown in FIGS. 7B, 8B and 9B, a gate insulation layer 118 is formed on the transparent substrate 100 covering the metal layer previously formed. The gate insulation layer 118 may be an inorganic substance, such as silicon nitride ($SiN_x$) or silicon oxide ($SiO_2$), or an organic substance, such as benzocyclobutene (BCB) or acryl-based resin. Next, an amorphous silicon (a—Si:H) film 119a and an impurity-doped amorphous silicon ($n^+/p^+$ a—Si:H) film 119b are formed in series on the gate insulation layer 118.

Figure 7C:
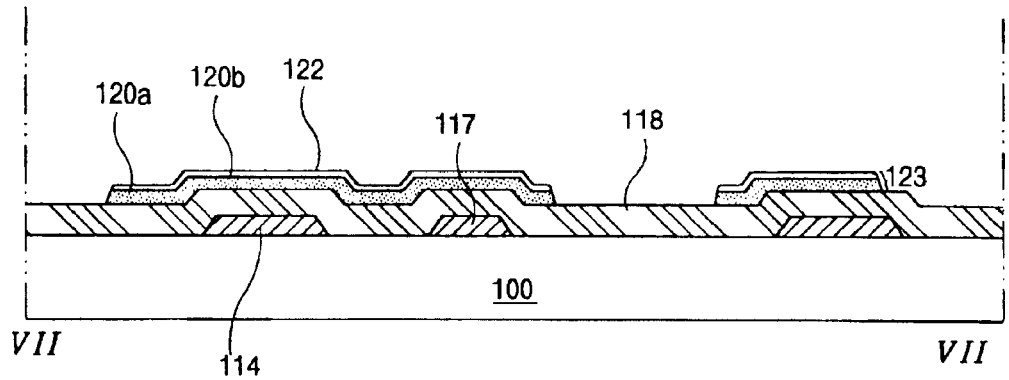
Figure 8C:
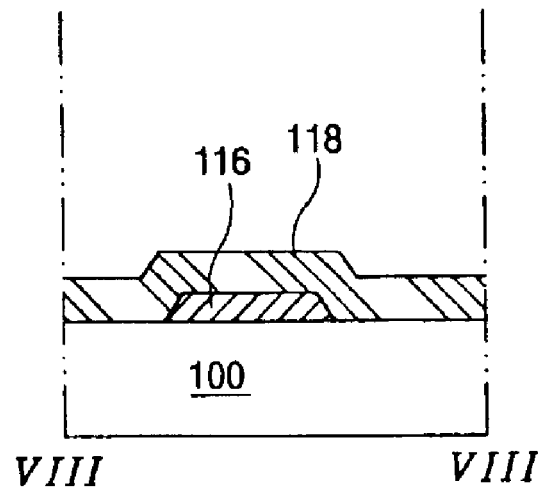
Figure 9C:
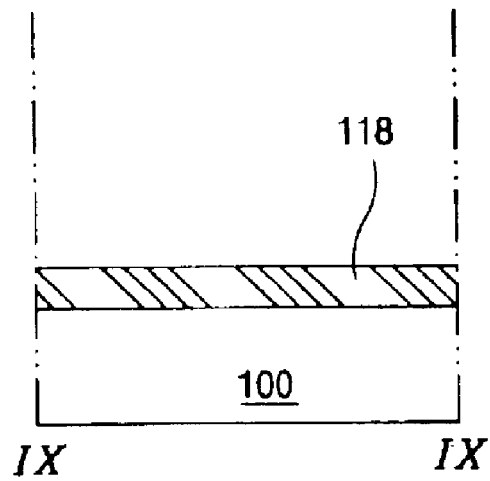

Next, as shown in FIGS. 7C, 8C and 9C, the amorphous silicon film 119a and the impurity-doped amorphous silicon film 119b are simultaneously patterned to form the active line 120a, the active layer 120b and an ohmic contact layer 122. The active line 120a has the same shape as a data line that is formed in a later step. The active layer 120b extends from the active line 120a over the gate electrode 114 and over the metal island pattern 117. The ohmic contact layer 122 has the same shape as the active line 120a and layer 120b. The ohmic contact layer 122 is formed on the active layer 120b. Furthermore, a silicon island pattern 123 consisting of amorphous silicon and impurity-doped amorphous silicon is formed on the gate insulation layer 118, particularly over the gate line 112. The silicon island pattern 123 has the same shape as the capacitor electrode that is formed in a later step, so the silicon island pattern 123 helps to increase adherence of the metal layer (the capacitor electrode). Meanwhile, as shown in FIGS. 8C and 9C, no silicon layers are formed in portions for the gate and data pads.

Figure 7D:
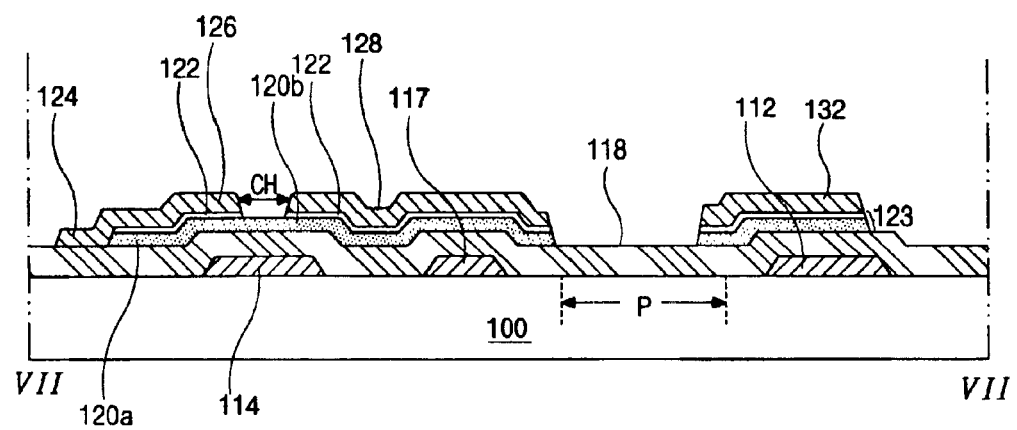
Figure 8D:
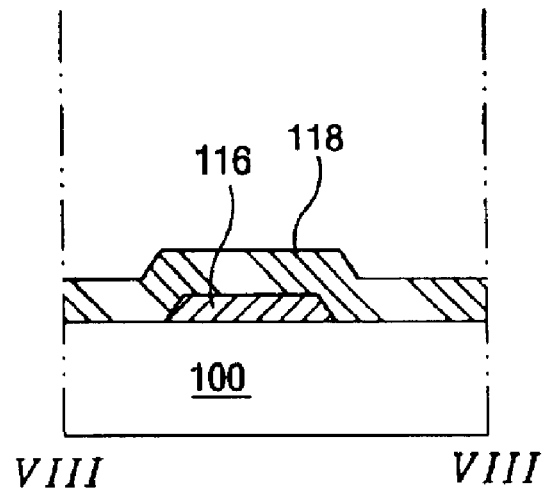
Figure 9D:
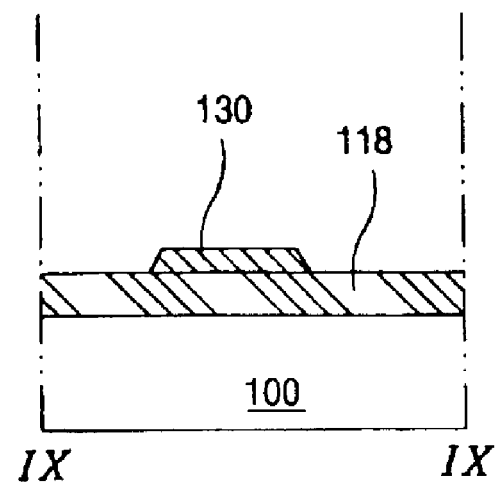

Next, as shown in FIGS. 7D, 8D and 9D, the source electrode 126 and the drain electrode 128 are formed from a second metal over the ohmic contact layer 122. By depositing and patterning the second metal, both the source electrode 126 and the drain electrode 128 are formed. Along with the data line 124, the capacitor electrode 132 and the data pad 130 are formed. In the present embodiment, the data line 124 overlaps the active line 120a, and the source electrode 126 extends from the data line 124. The source electrode 126 and the drain electrode 128 are spaced apart from each other and respectively overlap opposite ends of the gate electrode 114. The drain electrode 128 is formed over the metal island pattern 117 and overlaps the metal island pattern 117. The data line 124 defines the pixel region P with the gate line 112. The data pad 130 is disposed at the end of the data line 124 such that the data pad 130 supplies the image signal to the data line 124. The capacitor electrode 132 is formed on the silicon island pattern 123. As discussed above, the capacitor electrode 132 overlaps a portion of the gate line 112 to define the storage capacitor C (in FIG. 6). In this step of forming the capacitor electrode 132, the capacitor electrode 132 may be positioned just on the gate insulation layer 118 if the silicon island pattern 123 is not previously formed. Meanwhile, a portion of the ohmic contact layer 122 between the source electrode 126 and drain electrode 128 is eliminated to form a channel region CH.

Figure 7E:
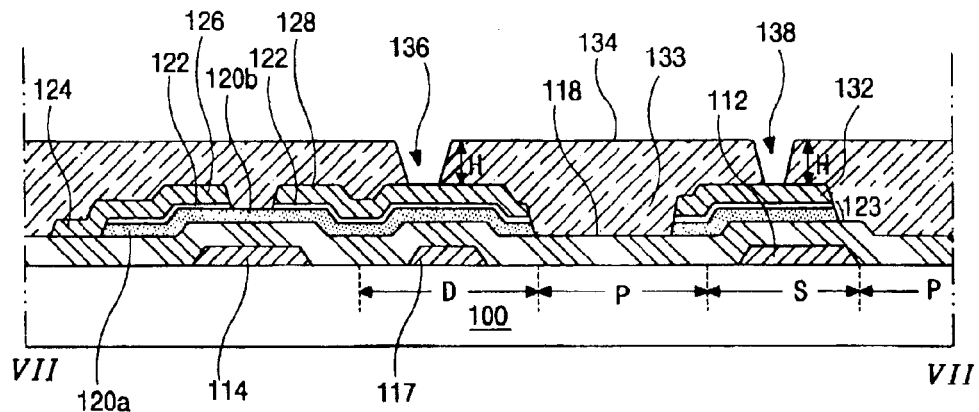
Figure 8E:
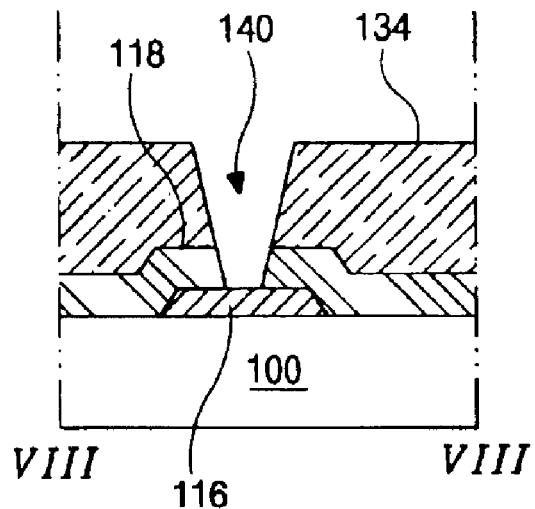
Figure 9E:
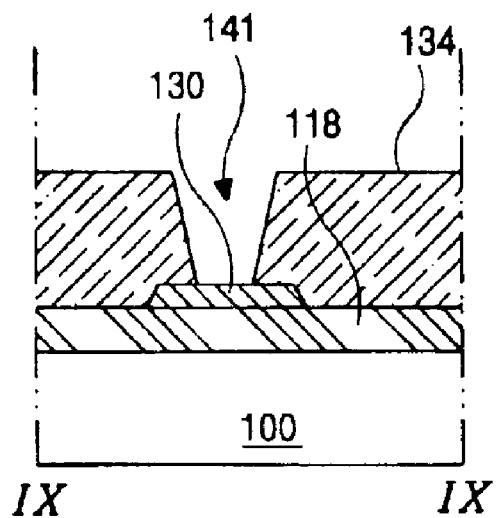

Next as shown in FIG. 7E, 8E and 9E, a passivation layer 134 is formed on and over the above-mentioned intermediates with an organic substance such as benzocyclobutene (BCB) or an acryl-based resin. By patterning the passivation layer 134, a drain contact hole 136 is formed that exposes a portion of the drain electrode 128. The drain contact hole 136 is formed over the metal island pattern 117 in the drain region D. While forming the drain contact hole 136, the storage contact hole 138 and a data pad contact hole 142 are also formed. The storage contact hole 138 is formed in the storage region S over the gate line 112 and exposes a portion of the capacitor electrode 132. The data pad contact hole 142 exposes a portion of the data pad 130. Furthermore, by patterning both the passivation layer 134 and the gate insulation layer 118, a gate pad contact hole 140 is formed that exposes a portion of the gate pad 116. The same layers are formed both beneath the drain contact hole 136 and beneath the storage contact hole 138 since the metal island pattern 117 is formed in the drain region D. Therefore, the passivation layer 134 has the same height H both in the drain region D and in the storage region S. Similarly, both the drain contact hole 136 and the storage contact hole 138 have the same depth H and are formed simultaneously without any over-etch.

Figure 7F:
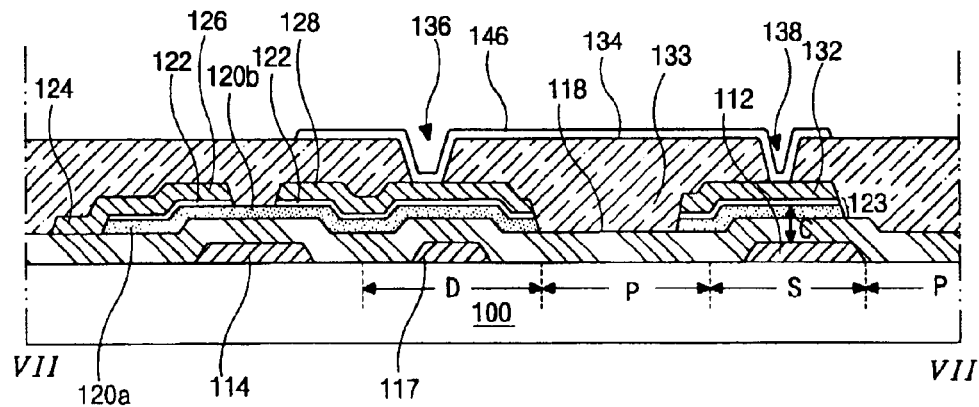
Figure 8F:
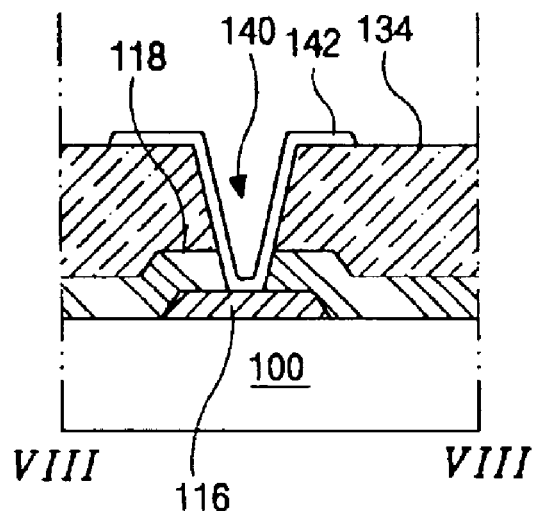
Figure 9F:
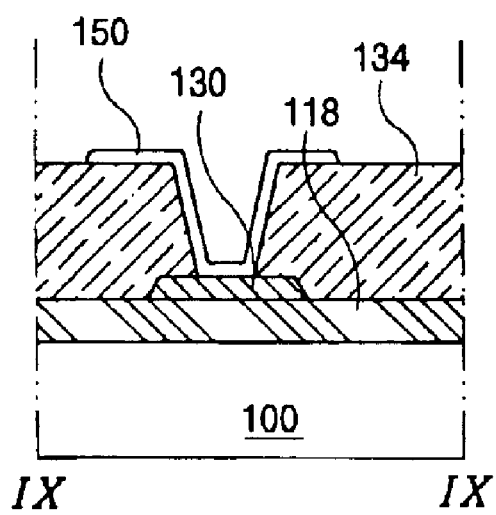

Next, as shown in FIGS. 7F, 8F and 9F, a transparent conductive material, such as indium zinc oxide (IZO) or indium tin oxide (ITO), is deposited upon the passivation layer 134 having the aforementioned contact holes, and subsequently patterned to form the pixel electrode 146, the gate pad terminal 142 and the data pad terminal 150. For example, as shown in FIG. 7F, the pixel electrode 146 electrically contacts the drain electrode 128 and the capacitor electrode 132 through the drain contact hole 136 and through the storage contact hole 138, respectively. Further, as shown in FIG. 8F, the gate pad terminal 146 electrically contacts the gate pad 116 through the gate pad contact hole 140. Still further, as shown in FIG. 9F, the data pad terminal 150 electrically contacts the data pad 130 through the data pad contact hole 142.

In the array substrate according to the present invention, the storage capacitor C includes the overlapping portion of the gate line 112, the gate insulation layer 118, and the capacitor electrode 132. The overlapping portion of the gate line 112 serves as a first electrode of the storage capacitor; the gate insulation layer 118 serves as a dielectric layer; and the capacitor electrode 132 serves as a second electrode of the storage capacitor.

As discussed above, the present embodiment discloses the array substrate having metal island pattern on the substrate beneath the drain electrode. The metal island pattern is disposed beneath the drain contact hole through which the pixel electrode contacts the drain electrode. Since the metal island pattern has the same thickness as the gate line, the passivation layer may have the same height in the drain region and in the storage region. Therefore, when the contact holes are formed, the over-etch does not occur.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. An array substrate for use in a liquid crystal display device, comprising:
    a substrate;
    at least a gate line, a gate electrode and a metal island pattern which are formed on the substrate, the gate line arranged in a transverse direction, the gate electrode extending from the gate line, the metal island pattern disposed next to the gate electrode and isolated from the gate electrode and the gate line;
    a gate insulation layer formed on the substrate while covering the gate line, the gate electrode and the metal island pattern;
    an active line and an active layer on the gate insulation layer, and an ohmic contact layer on the active line and on the active layer, wherein the active line is arranged in a longitudinal direction perpendicular to the gate line and the active layer extends from the active line over the gate electrode and over the metal island pattern;
    at least a data line, a source electrode, a drain electrode and a capacitor electrode, wherein the data line is arranged in a longitudinal direction to overlap the active line and defines a pixel region with the gate line, wherein the a source electrode is on the ohmic contact layer and extends from the data line, wherein the drain electrode is disposed on the ohmic contact layer over the metal island pattern and spaced apart from the source electrode, and wherein the capacitor electrode is positioned over the gate line and has an island shape;
    a passivation layer on the gate insulation layer to cover the data line, the source electrode, the drain electrode and the capacitor electrode, wherein the passivation layer has a drain contact hole to the drain electrode over the metal island pattern and a storage contact hole to the capacitor electrode, and wherein the storage contact hole is disposed over the gate line; and
    a pixel electrode formed on the passivation layer in the pixel region, the pixel electrode contacting the drain electrode and the drain electrode through the drain contact hole and through the storage contact hole, respectively.

2. The array substrate of claim 1, further comprising a silicon island pattern interposed between the gate insulation layer and the capacitor electrode.

3. The array substrate of claim 2, wherein the silicon island pattern has the same shape as the capacitor electrode.

4. The array substrate of claim 2, wherein the silicon island pattern includes amorphous silicon and impurity-doped amorphous silicon.

5. The array substrate of claim 1, further comprising a gate pad at the end of the gate line and a data pad at the end of the data line.

6. The array substrate of claim 5, further comprising a gate pad terminal that contacts the gate pad and a data pad terminal that contacts the data pad.

7. The array substrate of claim 1, wherein the ohmic contact layer is interposed between the active line and the data line.

8. The array substrate of claim 1, wherein the ohmic contact layer is interposed between the active layer and the source electrode and between the active layer and the drain electrode.

9. The array substrate of claim 1, wherein the metal island pattern has the same height as the gate line.

10. A method of forming an array substrate for use in a liquid crystal display device, comprising:
    providing a substrate;
    simultaneously forming at least a gate line, a gate electrode and a metal island pattern on the substrate, wherein the gate line is arranged in a transverse direction, wherein the gate electrode extends from the gate line, and wherein the metal island pattern is disposed next to the gate electrode and isolated from the gate electrode and the gate line;
    forming a gate insulation layer on the substrate to cover the gate line, the gate electrode and the metal island pattern;
    simultaneously forming an active line and an active layer on the gate insulation layer, and forming an ohmic contact layer on the active line and on the active layer, wherein the active line is arranged in a longitudinal direction perpendicular to the gate line and the active layer extends from the active line over the gate electrode and over the metal island pattern;

simultaneously forming at least a data line, a source electrode, a drain electrode and a capacitor electrode, wherein the data line is arranged in a longitudinal direction to overlap the active line and defines a pixel region with the gate line, wherein the a source electrode is on the ohmic contact layer and extends from the data line, wherein the drain electrode is disposed on the ohmic contact layer over the metal island pattern and spaced apart from the source electrode, and wherein the capacitor electrode is positioned over the gate line and has an island shape;

forming a passivation layer on the gate insulation layer to cover the data line, the source electrode, the drain electrode and the capacitor electrode;

patterning the passivation layer to form a drain contact hole to the drain electrode over the metal island pattern and to form a storage contact hole to the capacitor electrode, and wherein the storage contact hole is disposed over the gate line; and forming a pixel electrode on the passivation layer in the pixel region, the pixel electrode contacting the drain electrode and the drain electrode through the drain contact hole and through the storage contact hole, respectively.

11. The method of claim 10, further comprising forming a silicon island pattern between the gate insulation layer and the capacitor electrode.

12. The method of claim 11, wherein the silicon island pattern has the same shape as the capacitor electrode.

13. The method of claim 11, wherein the silicon island pattern includes amorphous silicon and impurity-doped amorphous silicon.

14. The method of claim 10, further comprising forming a gate pad at the end of the gate line and a data pad at the end of the data line.

15. The method of claim 14, further comprising simultaneously forming a gate terminal pad and a data pad terminal, wherein the gate pad terminal contacts the gate pad and a data pad terminal contacts the data pad.

16. The method of claim 10, wherein the ohmic contact layer is interposed between the active line and the data line.

17. The method of claim 10, wherein the ohmic contact layer is interposed between the active layer and the source electrode and between the active layer and the drain electrode.

18. The method of claim 10, wherein the metal island pattern has the same height as the gate line.

19. An array substrate for use in a liquid crystal display device, comprising:

a substrate;

gate and data lines which cross each other to define a pixel region;

a thin film transistor positioned near a crossing of the gate and data lines, wherein the thin film transistor includes a gate electrode, an active layer, an ohmic contact layer, a source electrode and a drain electrode;

a metal island pattern formed on the substrate beneath the drain electrode next to the gate electrode, and isolated from the gate electrode and the gate line;

a storage capacitor including a portion of the gate line as a first electrode and a capacitor electrode as a second electrode; and a pixel electrode positioned in the pixel region, the pixel electrode contacting the capacitor electrode through a storage contact hole.

20. The array substrate of claim 19, wherein the active layer includes amorphous silicon and the ohmic contact layer includes impurity-doped amorphous silicon.

21. The array substrate of claim 20, wherein the ohmic contact layer is interposed between the active layer and the source electrode and between the active layer and the drain electrode.

22. The array substrate of claim 21, wherein the ohmic contact layer extends beneath the data line such that the data line overlaps the ohmic contact layer.

23. The array substrate of claim 19, further comprising a silicon island pattern interposed between the gate line and the capacitor electrode.

24. The array substrate of claim 23, wherein the silicon island pattern contacts the capacitor electrode and has the same shape as the capacitor electrode.

25. The array substrate of claim 23, wherein the silicon island pattern includes amorphous silicon and impurity-doped amorphous silicon.

26. A method of forming an array substrate for use in a liquid crystal display device, comprising:

providing a substrate;

forming a gate line on the substrate;

forming a data line which cross the gate line to define a pixel region;

forming a thin film transistor positioned near a crossing of the gate and data lines, wherein the thin film transistor includes a gate electrode, an active layer, an ohmic contact layer, a source electrode and a drain electrode;

forming a conductive island pattern on the substrate, wherein the conductive island pattern is disposed beneath the drain electrode and next to the gate electrode, and isolated from the gate electrode and the gate line;

forming a storage capacitor that a portion of the gate line as a first electrode and a capacitor electrode as a second electrode; and forming a pixel electrode in the pixel region, the pixel electrode contacting the capacitor electrode through a storage contact hole.

27. The method of claim 26, wherein the active layer includes amorphous silicon and the ohmic contact layer includes impurity-doped amorphous silicon.

28. The method of claim 27, wherein the ohmic contact layer is formed between the active layer and the source electrode and between the active layer and the drain electrode.

29. The method of claim 28, wherein the ohmic contact layer extends beneath the data line such that the data line overlaps the ohmic contact layer.

30. The method of claim 26, further comprising forming a silicon island pattern between the gate line and the capacitor electrode.

31. The method of claim 30, wherein the silicon island pattern contacts the capacitor electrode and has the same shape as the capacitor electrode.

32. The method of claim 30, wherein the silicon island pattern includes amorphous silicon and impurity-doped amorphous silicon.

* * * * *